United States Patent Office 3,756,916

Patented Sept. 4, 1973

3,756,916

METHOD OF ISOLATING AMINO ACID PRODUCING MUTANT MICROORGANISMS AND MUTANTS OBTAINED THEREFROM

Richard Irwin Leavitt, Morrisville, Pa., assignor to Mobil Oil Corporation

No Drawing. Filed Mar. 29, 1971, Ser. No. 129,190
Int. Cl. C12b *1/00*
U.S. Cl. 195—28 R 8 Claims

ABSTRACT OF THE DISCLOSURE

A method of isolating a mutant strain of an amino acid-producing microorganism, which mutant produces said amino acid at a greater rate than normally produced by its microorganism parent, by the step of culturing the microorganism parent in the presence of (1) an antimetabolite and (2) a co-inhibitor agent, thereby inhibiting the growth of the normal microorganism, isolating and subculturing the mutant and obtaining the desired amino acid.

BACKGROUND OF THE INVENTION

Field of the invention

This invention relates to a method of producing amino acids, and particularly it relates to a method of obtaining an acid from an over-producing mutant of a normal microorganism.

Description of the prior art

L-lysine and many other amino acids are all known nutritional agents. L-lysine, in particular, is used as a food-enriching substance both in dietetic and medical applications. It is recognized as an indispensable component for animal nutrition. Amino acids are normally produced in the metabolism of bacteria. If a microorganism is cultured in the presence of necessary elements, i.e., carbon, oxygen, nitrogen, phosphorous, sulfur and certain minerals, it will produce among other nutrients, amino acids required for its growth. It is also known that certain mutant strains are capable of producing specific amino acids at a greater rate than is required for the normal growth of the microorganism. In the past, there have been attempts to isolate mutant strains to obtain L-lysine. In British Pat. No. 851,396, there is claimed a mutant that produces L-lysine by culturing a nutritionally defective mutant of *Micrococcus glutamicus*. In this patent, however, the mutants which require certain amino acids for their growth are obtained by ultra-violet radiation. In Canadian Pat. No. 835,356, L-lysine is also produced through fermentation by isolating mutant strains through specific organisms which require certain amino acids for growth. In both of these patents, the mutants require homoserine or threonine and methionine; in both references, the mutants were obtained by means which were not a part of the claimed invention.

Chemical mutation is discussed in "Basic Bacteriology," La Manna and Mallette, Second Edition, the William & Wilkins Company, Baltimore, 1959, on pages 646 to 649. However, while this text mentions ultraviolet and X-ray radiation to isolate mutants, there is no disclosure of a combination of agents which at the same time inhibit a microorganism while enhancing the growth of a mutant strain.

It is, therefore, one object of this invention, to provide a method of isolating mutant strains of a microorganism, such as Brevibacterium. It is another object to isolate novel mutant strains. It is a further object of this invention to provide a method of obtaining amino acids in increased yields.

SUMMARY OF THE INVENTION

Specific amino acids can be obtained in greater than normal quantities by treating a culture of microorganisms with an antimetabolite and, as co-inhibitor, a branched-path amino acid, thereby favoring the growth of a mutant strain of the microorganism which overproduces the amino acids. The amino acids so produced are synthesized coincidentally from a common intermediate or precursor of the said co-inhibitor amino acid. The mutant strain, after isolation from the parent, excretes an amino acid in greater amounts than that produced overall by the parent organism.

DESCRIPTION OF THE PREFERRED EMBODIMENTS

More specifically, the microorganism in this invention is treated with a combination of at least two inhibitors, one of which is an antimetabolite which only produces pronounced growth inhibition in the presence of a branched-pathway amino acid and the other is an amino acid belonging to a group of amino acids which is synthesized by the microorganism from a common intermediate.

Antimetabolites are generally defined as substances which interfere with the utilization of metabolites by an organism ("Basic Bacteriology," page 799) or in some way repress or inhibit one or more pathways of the organism's metabolic process. However, the antimetabolites of this invention are those which only affect the metabolic process of an organism in conjunction with the branched-pathway amino acid co-inhibitor. Used alone, the antimetabolites are ineffective. Antibiotics, for example, may be used in the process of this invention. Such antimetabolities as bactracin, actimomycin C, allopurinol, antimycin, azaserine, streptomycin, penicillin, valinomycin, cycloserine, o-fluorophenylalanine, beta-phenylserine, 3-fluorotyrosine, 6 - fluorotryptophan, L-o-ethylthreonine, norleucine, norvoline and the like may be used.

As indicated previously, the co-inhibitor of this invention is an amino acid which is biochemically related to the mutant-excreted amino acid, that is, a branched-pathway amino acid. This acid is one that would normally occur in the bio-synthetic sequence of the metabolic process in which the desired amino acid also occurs.

Merely exposing the microorganism to either the antimetabolite at prescribed dosages or the co-inhibitor alone produces little or no inhibition. Moreover, combinations of any antimetabolite and non-pathway amino acids are not effective in producing mutant strains. Only the treatment of the microorganism by the combined system of this invention leads to isolation of the mutant.

In accordance with the present invention, mutant strains may be obtained from any microorganism parent. The mutant strains obtained by the treatment of the antimetabolite/co-inhibitor system are those which require the desired amino acid for growth. Of special interest are the microorganism families of the Eubacteriales order: Azobacterium, Rhizobium, Achromobacterium, Micrococcus, Enterobacterium, Brevibacterium, Corynebacterium, Bacillus, and the like. For the purpose of illustration, a Brevibacterium species is employed for isolating mutants in accordance with the method of this invention. The Brevibacterium microorganism is rod-shaped and gram-positive. It is capable of growing on normal paraffins as the sole source of carbon. Species are found in dairy products, soil and various decomposition products.

The culture medium used to initially treat the parent microorganism, such as Brevibacterium, are known. It may include one or a mixture of normal paraffins having from 8 to about 30 carbon atoms as the source of carbon. Those paraffins used particularly include n-octane, n-dodecane, n-tridecane, n-tetradecane, n-pentadecane, n-hexadecane, n-heptadecane, n-octadecane and the like. Other carbon sources are carbohydrates, such as glucose, yeast, starch hydrolysate, molasses and organic acids of from 1 to 5 carbon atoms, preferably acetic and propionic. Nitrogen sources include inorganic ammonium salts, urea, yeast or meat extract, fish meal, soybean or casein hydrolysates and the like. The source of other non-carbon elements includes the chlorides, phosphates, carbonates and sulfates of potassium, magnesium, calcium and iron. Natural nutrient media, such as mineral agar, may also be used. Mixtures of individual source nutrients may be employed.

The growth of the mutant strain occurs under aerobic conditions at incubation temperatures ranging from 20° to about 60° C., preferably 25° to 40° C. Initially, a nutrient-containing plate impregnated with the antimetabolite/co-inhibitor combination is inoculated with the parent microorganism. The weight ratio of the said combination to the microorganism is not critical and may vary. Preferably, the concentration of the combination is in excess. Hence, weight ratios of 0.1:1 to 200:1 of total inhibitors to microorganisms may be used, but preferred weight ratios are 1:1 to 10:1.

The growth of the normal microorganism is inhibited as evidenced by clear areas on the surface of the plate. This inhibition is noticed within about 17 hours of the impregnation. At the same time, isolated colonies of mutant cells begin to grow. These colonies are removed from the plate and purified by subculturing on a fresh plate. They are subjected to multiple transfers to insure that no contaminants are carried along.

Fermentation of the purified mutant colonies is also aerobic and may be carried out by conventional means in a shake-flask culture or submerged tank culture at a temperature from 20° to about 60° C. and a pH ranging from about 2.0 to about 10.0, and preferably 5.0 to 8.0. Control of the pH may be obtained by adding ammonium hydroxide, alkali metal hydroxide and the like. The mutant subculture is admixed with the aforementioned nutrients in suitable amounts to provide the basic chemical components. After the normal period for completion of the fermentation, the amino acid is recovered by known methods, such as centrifuging, chromatography, solvent extraction or ion-exchange.

The following examples are provided to illustrate this invention and are not considered a limitation of this invention. Percentages are on a weight basis.

EXAMPLE 1

A n-hexadecane-grown culture of Brevibacterium sp. is inoculated into a number of plates containing 20 grams of a mixed media of 0.5% glucose and 2.0% mineral agar. Each inoculum consists of 0.05 ml. of a dilute sample containing $10^7$ organisms in water. The plates are incubated for 17 hours at 36° C. with filter discs containing, in various combinations, 30 micrograms each of cycloserine, L-methionine, L-threonine and L-homoserine.

| Test | Antimetabolite | Amino acid co-inhibitor |
|---|---|---|
| 1 | Cycloserine | 0. |
| 2 | 0 | L-homoserine. |
| 3 | 0 | L-threonine. |
| 4 | 0 | L-methionine. |
| 5 | Cycloserine | L-homoserine. |
| 6 | do | L-threonine. |
| 7 | do | L-methionine. |

Of these tests, only tests 6 and 7 show inhibition of the growth of the culture as evidenced by clear areas on the test plates. The remaining test plates show little or no inhibition.

This example indicates that the two amino acids, L-threonine and L-methionine, which successfully inhibit the microorganism in conjunction with the antimetabolite cycloserine, are those in the metabolic path of L-lysine through the common intermediate aspartyl semialdehyde. The combination of L-homoserine and cycloserine has no detectable inhibitory effect.

EXAMPLE 2

Using the same Brevibacterium microorganism as in Example 1, a shake flask culture is diluted in water at sufficient concentration of the culture whereby 0.05 ml. of the sample would contain approximately 1000 organisms.

Culture plates containing 20 grams of mixed media consisting of 0.5% glucose and 2.0% mineral agar are impregnated with 100 micrograms/ml. each of both cycloserine and L-threonine. Five of the culture plates are inoculated with the dilute culture sample and the plates are incubated at 36° C. for one to two days. At the end of the incubation period, a number of cultures are growing on the plates.

These cultures are removed from the individual plates and subcultured on glucose-agar media. They are then purified by washing in 0.01 M phosphate buffer of pH 7.0 and diluted in sufficient amounts of the buffer to provide a 1000-organism content in 0.05 ml. (as in the initial dilution). The diluted samples are inoculated into culture plates containing the cycloserine and L-threonine. Again the plates are incubated at the same temperature for approximately the same length of time as in the initial incubation. Each individual culture continues its growth. Such transfer of each plate culture is repeated twice more, without evidence of inhibition.

The various cultures obtained from different plates and kept separate during the subsequent transfers, are placed in a shake flask with about 20 grams of a nutrient medium consisting of 0.62% (grams/100 grams) of n-hexadecane, 0.2% of glucose and 5.0% of mineral agar. Fermentation is carried out at 36° C. for 40 hours while maintaining the pH at between 5.5 and 7.5. Of the five cultures used in the fermentations, two excrete L-lysine. The lysine is identified by thin-layer chromatography using silica gel plates and a butanol-acetic acid-water (40:40:20) solvent system.

In addition, the identity and the amount of L-lysine present in the shake flask cultures are determined microbiologically using *Pediococcus cerevisiae* (ATCC 8042) as the assay organism. The assay organism is grown for 17 hours in a suitable medium and washed and suspended in saline solution which contains $10^8$ organisms per ml. To a melted L-lysine assay medium, containing 2% agar, is added 0.1 ml. of the suspension, and the combined materials are poured into several Petri dishes. The agar is allowed to solidify. Solutions of L-lysine obtained from the parent organism and the two mutant organisms and a L-lysine solution of known concentration are placed in separate dishes in containers accessible to the agar culture. The culture in each dish is then incubated at 37° C. for 17 hours. The diameters of the rings of resulting growth around each container are directly proportional to the L-lysine concentration in solution. By comparing the diameters in each dish, the yields of L-lysine obtained from the subcultured mutant cells and that obtained from the Brevibacterium sp. parent cells are as follows:

| Organism: | L-lysine obtained (mg./ml.) |
|---|---|
| Brevibacterium sp. | 0.5 |
| Mutant A | 3.0 |
| Mutant B | 2.0 |

In accordance with this invention, the following antimetabolite/co-inhibitor systems may be used in isolating mutants of microorganisms to obtain the desired amino acid:

| Amino acid | Antimetabolite | Co-inhibitor |
| --- | --- | --- |
| L-lysine | Cycloserine | L-threonine. |
| Do | Cycloserine | L-methionine. |
| L-phenylalanine | o-Fluorophenylalanine | L-tyrosine. |
| Do | Beta-phenylserine | Do. |
| L-tyrosine | 3-fluorotyrosine | L-tryptophan. |
| L-tryptophan | 6-fluorotryptophan | L-phenylalanine. |
| L-isoleucine | L-o-ethylthreonine | L-valine. |
| L-methionine | Norleucine | L-threonine. |
| L-valine | Norvaline | L-isoleucine. |

EXAMPLE 3

An n-hexadecane-grown culture of Brevibacterium sp. is inoculated as in Example 1. In this system, the anti-metalobite used is penicillin and the amino acid co-inhibitor is tyrosine. A mutant strain is isolated, as in the previous examples, which when subcultured in the absence of the inhibitor system excretes 10 times the amount of tryptophan (a branched pathway-amino acid) as that excreted by the sensitive parent.

This invention has been described by illustrative and representative disclosure susceptible of modification obvious to those skilled in the art, which modifications are within the scope of this invention limited only in the following claims:

I claim:

1. A method of isolating a mutant of an amino acid-excreting microorganism which mutant excretes said amino acid at a greater rate than required for the normal growth of the microorganism parent by the steps of (1) culturing the microorganism parent in the presence of (a) an antimetabolite and (b) as a co-inhibitor, a second amino acid related to the said excreted amino acid through a common biosynthetic intermediate, thereby inhibiting the growth of the said parent, and (2) isolating and subculturing the said mutant in absence of (a) and (b).

2. The method of claim 1 wherein the microorganism is a Brevibacterium species.

3. The method of claim 1 where the excreted amino acid is selected from the group consisting of L-lysine, phenylalanine, tyrosine, tryptophan, isoleucine, methionine and valine.

4. The method of claim 3 wherein the said amino acid is L-lysine.

5. The method of claim 1 wherein the said antimetabolite is an antibiotic which alone is incapable of inhibiting the growth of the said microorganism parent.

6. The method of claim 4 wherein the antimetabolite is cycloserine.

7. The method of claim 3 wherein the co-inhibitor is selected from the group consisting of L-threonine and L-methionine.

8. The method of obtaining L-lysine by subculturing and causing fermentation of the mutant obtained by the method of claim 1.

References Cited

UNITED STATES PATENTS 3,524,797 8/1970 Woodruff et al. ........ 195—29
3,687,810 8/1972 Kurihara et al. ........ 195—29

A. LOUIS MONACELL, Primary Examiner

R. B. PENLAND, Assistant Examiner

U.S. Cl. X.R.

195—47, 112